United States Patent
Yano et al.

(10) Patent No.: US 7,619,818 B2
(45) Date of Patent: Nov. 17, 2009

(54) ELLIPTICALLY POLARIZING PLATE AND IMAGE DISPLAY

(75) Inventors: Shuuji Yano, Ibaraki (JP); Masayuki Kawai, Ibaraki (JP); Ryouji Kinoshita, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 408 days.

(21) Appl. No.: 11/569,538

(22) PCT Filed: Apr. 5, 2005

(86) PCT No.: PCT/JP2005/006636

§ 371 (c)(1),
(2), (4) Date: Nov. 22, 2006

(87) PCT Pub. No.: WO2005/116700

PCT Pub. Date: Dec. 8, 2005

(65) Prior Publication Data

US 2008/0018831 A1    Jan. 24, 2008

(30) Foreign Application Priority Data

May 26, 2004 (JP) .............................. 2004-156001
Sep. 29, 2004 (JP) .............................. 2004-284618

(51) Int. Cl.
*G02B 5/30* (2006.01)
(52) U.S. Cl. ........................................ 359/497; 349/96
(58) Field of Classification Search .................. None
See application file for complete search history.

(56) References Cited

U.S. PATENT DOCUMENTS 6,115,095 A    9/2000    Suzuki et al.

2003/0210370 A1    11/2003    Yano et al.
2004/0125291 A1    7/2004    Kawahara et al.

FOREIGN PATENT DOCUMENTS

CN    1448734 A    10/2003

(Continued)

OTHER PUBLICATIONS

Office Action of Corresponding Chinese Patent Application No. 200580011692.9 issued Sep. 21, 2007.

(Continued)

*Primary Examiner*—Stephone B Allen
*Assistant Examiner*—Derek S Chapel
(74) *Attorney, Agent, or Firm*—Westerman, Hattori, Daniels & Adrian, LLP

(57) ABSTRACT

An elliptically polarizing plate including: a polarizer; and an optical film that includes a laminate of: a retardation film A that includes a cyclic polyolefin resin-containing thermoplastic polymer and has uniaxially-aligned positive refractive-index anisotropy characterized by $nx > ny \approx nz$; and a retardation film B that is fixed to homeotropic alignment and has positive refractive-index anisotropy characterized by $nz1 > nx1 \approx ny1$, wherein the optical film is laminated on one side of the polarizer in such a manner that a slow axis of the retardation film A is perpendicular to an absorption axis of the polarizer. The elliptically polarizing plate can suppress a reduction in contrast at wide viewing angles when applied to in-plane switching mode active matrix liquid crystal displays, and can be highly effective for improvements against color shift.

8 Claims, 1 Drawing Sheet

FOREIGN PATENT DOCUMENTS

| | | | |
|---|---|---|---|
| CN | 1480747 A | 3/2004 | |
| JP | 11-133408 A | 6/1999 | |
| JP | 2001-242462 A | 9/2001 | |
| JP | 2003-332068 A | 11/2003 | |
| JP | 2004-70344 A | 3/2004 | |
| JP | 2005-189632 A | 7/2005 | |

OTHER PUBLICATIONS

International Search Report of PCT/JP2005/006636, date of mailing Aug. 2, 2005.

[FIG.1]
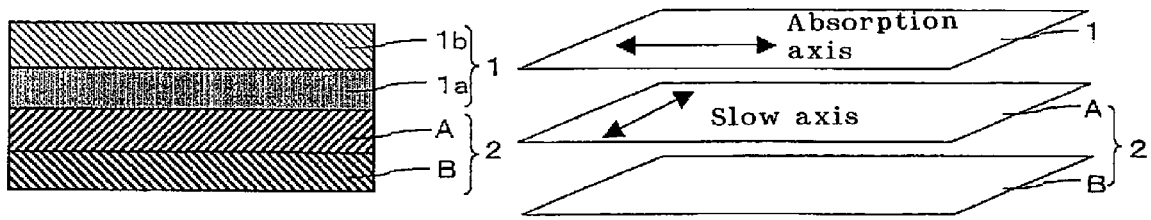
[FIG.2]
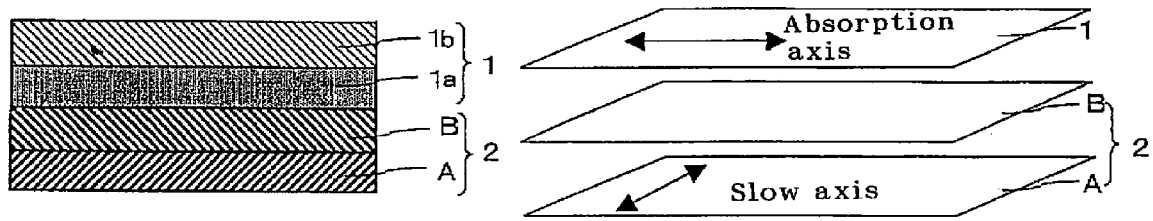
[FIG.3]
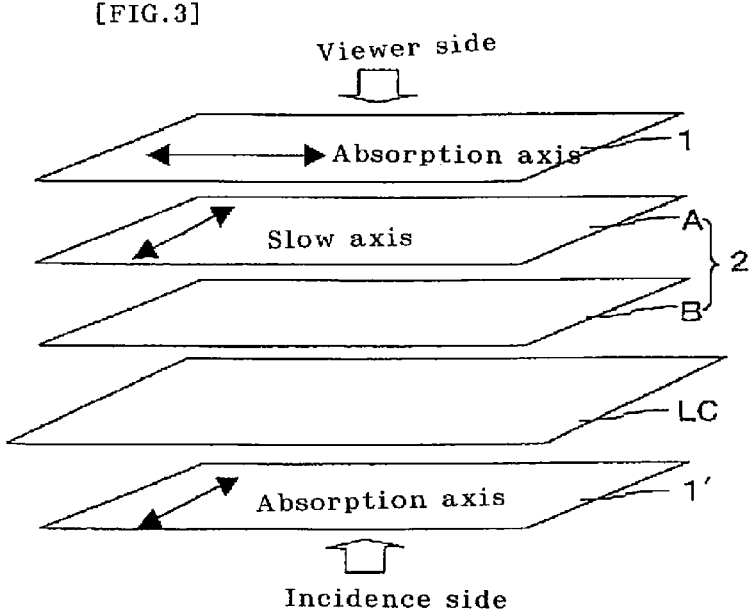
[FIG.4]
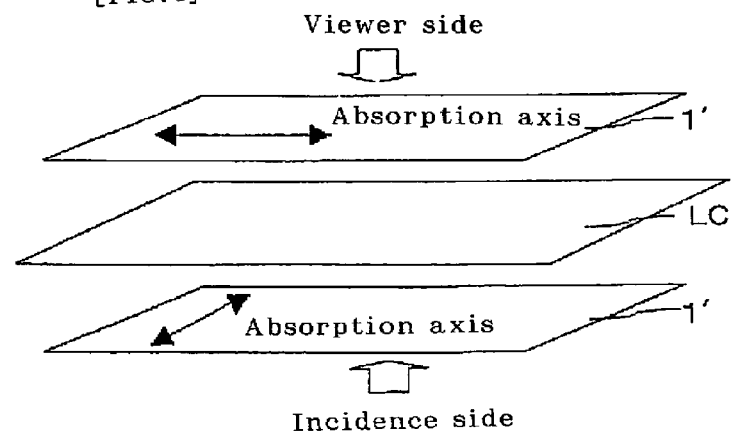

ELLIPTICALLY POLARIZING PLATE AND IMAGE DISPLAY

TECHNICAL FIELD

The invention relates to an elliptically polarizing plate including a laminate of a polarizer and an optical film in which retardation films are laminated. The invention also relates to an image display, such as a liquid crystal display, an organic electro-luminescence display and a plasma display panel, using the elliptically polarizing plate. In particular, the elliptically polarizing plate of the invention is suitable for in-plane switching (IPS)-mode active matrix liquid crystal displays.

BACKGROUND ART

Conventionally, so called TN mode liquid crystal displays are largely used in which a liquid crystal having positive dielectric anisotropy is twisted homogeneous aligned between substrates opposed to each other. In the TN mode, however, the liquid crystal molecule in the vicinity of the substrate can cause birefringence due to the driving characteristics so that light leakage can occur, which makes perfect black viewing difficult. While, an in-plane switching-mode liquid crystal display presents a pixel display in a way such that an electric field in parallel with a liquid crystal substrate is formed between pixel electrodes and a common electrode. The liquid crystal display of this type has an advantage, which makes perfect black viewing, which a wide viewing angle is obtained as compared with a TN mode type liquid crystal display in which a vertical electric field to a substrate is formed.

In conventional in-plane switching-mode active matrix liquid crystal display, however, an almost perfect black viewing can be achieved in a direction normal to a panel, whereas in a case where the panel is viewed in a direction deviated from the direction normal to the panel, there has been remained a problem that unavoidable light leakage as a characteristic of a polarizing plate occurs in a direction deviated from the optical axis of the polarizing plates disposed on the top or bottom of a liquid crystal cell with the result is that a viewing angle is narrowed and a contrast is reduced. In another case where the panel is viewed in a direction oblique relative thereto, an optical path of light is longer, which alters an apparent retardation in a liquid crystal layer. Therefore, when viewed at different viewing angles, a wavelength of transmitted light varies, a color of a screen image changes, thereby causing a color shift depending on an observation direction.

Various kinds of proposals have been offered in order to improve reduction in contrast and a color shift depending on a viewing angle in such conventional in-plane switching-mode liquid crystal display(Japanese Patent Application Laid-Open (JP-A) No. 11-133408, JP-A No. 2001-242462). For example, in JP-A No. 11-133408, a proposal has been offered on a technique that compensation layers each with an optical anisotropy are inserted between a liquid crystal layer and respective polarizing plates in pair sandwiching the liquid crystal layer therebetween. This technique is effective for a color shift, but cannot sufficiently suppress a reduction in contrast. In JP-A No. 2001-242462, another proposal has been offered on a technique that first and second retardation plates are inserted between a liquid crystal layer and respective polarizing plates in pair sandwiching the layer therebetween. While it is described in the publication that this technique is effective for improvement on reduction in contrast and color shift, a higher improvement effect has been still desired.

DISCLOSURE OF INVENTION

Problems to be Solved by the Invention

It is an object of the invention to provide an elliptically polarizing plate that includes a laminate of a retardation film and a polarizer, can suppress a reduction in contrast at wide viewing angles when applied to in-plane switching mode active matrix liquid crystal displays, and can be highly effective for improvements against color shift.

It is another object of the invention to provide an image display using such an elliptically polarizing plate. More particularly, it is a further object of the invention to provide an in-plane switching mode active matrix liquid crystal display in which a reduction in contrast can be suppressed at wide viewing angles and an improvement effect against color shift can be high.

The inventors have conducted serious studies in order to solve the problem with the result that an elliptically polarizing plate shown below has been discovered, which has led to the invention.

The invention related to an elliptically polarizing plate, comprises:

a polarizer; and an optical film that comprises a laminate of:

a retardation film A that comprises a cyclic polyolefin resin-containing thermoplastic polymer and has uniaxially-aligned positive refractive-index anisotropy characterized by nx>ny≈nz, wherein nx is a refractive index in the direction of X axis along which the in-plane refractive index is maximum, ny is a refractive index in the direction of Y axis perpendicular to X axis, and nz is a refractive index in the direction of Z axis that is the direction of the thickness; and a retardation film B that is fixed to homeotropic alignment and has positive refractive-index anisotropy characterized by $nz_1 > nx_1 \approx ny_1$, wherein $nx_1$ is a refractive index in the direction of X axis along which the in-plane refractive index is maximum, $ny_1$ is a refractive index in the direction of Y axis perpendicular to X axis, and $nz_1$ is a refractive index in the direction of Z axis that is the direction of the thickness, wherein the optical film is laminated on one side of the polarizer in such a manner that a slow axis of the retardation film A is perpendicular to an absorption axis of the polarizer.

The retardation films A and B are laminated in the elliptically polarizing plate of the invention. The retardation film A has a compensation function derived from uniaxially-aligned positive refractive-index anisotropy, and the retardation film B also enables control of the retardation in the thickness direction. These films can suppress a reduction in contrast, which would be due to a viewing angle variation-induced change of the axis of a polarizer, can provide an improvement against color shift, and can provide compensation at wide viewing angles.

The retardation film A contains a cyclic polyolefin resin. The cyclic polyolefin resin has a relatively small photoelastic coefficient and can suppress unevenness, which would otherwise easily occur due to tensile stress or in a durability test or the like particularly in applications of large panels such as in-plane switching (IPS) mode panels.

In the elliptically polarizing plate of the invention, the retardation film A is also laminated in such a manner that its slow axis is perpendicular to the absorption axis of the polarizer. The perpendicular arrangement as described above is suitable for the production of high contrast.

The optical film including a laminate of the retardation films A and B is laminated on the polarizer and also serves as a protective film. Thus, the optical film is advantageous, because it can form a thin or lightweight product, suppress a reduction in contrast, and provide an improvement against color shift.

In the elliptically polarizing plate, the optical film is preferably laminated on the polarizer in such a manner that the retardation film A and the retardation film B are placed in this order from the polarizer side, because such placement can suppress a reduction in contrast at wide viewing angles and produce an improvement effect against color shift.

In the elliptically polarizing plate, a norbornene resin-containing film is preferably used for the retardation film A. The norbornene resin-containing film is preferred, because it can have good durability or the like under the conditions of high temperatures or high temperature and high humidity.

In the elliptically polarizing plate, the retardation film B preferably has a thickness direction retardation $\{((nx_1+ny_1)/2)-nz_1\} \times d$ of $-500$ nm to $-10$ nm, wherein d is its thickness (nm), in order to suppress color shift and a reduction in contrast at wide viewing angles. The thickness direction retardation of the retardation film B is more preferably from $-300$ nm to $-30$ nm, still more preferably from $-200$ nm to $-50$ nm.

In the elliptically polarizing plate, the retardation film B is preferably a film containing a side chain type liquid crystal polymer, while it may be of any type as long as it has refractive indices as stated above. Examples of other materials for the retardation film B include materials whose in-plane refractive index can be made smaller in a stretching direction, which are so called negative optical materials. Examples of such materials include styrene resins, acrylic resins, and the like.

In the elliptically polarizing plate, a quarter wavelength plate may be used as the retardation film A.

The invention is also related to an image display characterized by comprising a laminate including the elliptically polarizing plate. The image display is preferably a liquid crystal display, particularly preferably an in-plane switching (IPS) driving mode active matrix liquid crystal display. The image display, such as a liquid crystal display, using the elliptically polarizing plate can achieve wide viewing angles and can suppress a reduction in contrast and provide an improvement against color shift, even when the display screen is viewed at oblique angles.

The liquid crystal display may be formed by placing the elliptically polarizing plate of the invention on one or both sides of a liquid crystal cell instead of any conventional polarizing plate. The elliptically polarizing plate of the invention may be placed in any position with respect to a liquid crystal cell. In terms of display quality, however, it is preferred that the optical film comprising a laminate of the retardation films A and B be placed on the liquid crystal cell side (namely, the optical film be placed between the liquid crystal cell and the polarizer) and that the optical film be placed between polarizers disposed in the crossed nicol arrangement in the liquid crystal display. The elliptically polarizing plate may be placed on a metal electrode to form an organic electro-luminescence display. In such an organic electro-luminescence display, the polarizer is preferably laminated at a place that is most distant from the liquid crystal cell or the metal electrode.

BRIEF DESCRIPTION OF DRAWINGS

FIG. 1 shows a cross-sectional view and a schematic diagram with respect to an embodiment of the elliptically polarizing plate according to the invention;

FIG. 2 shows a cross-sectional view and a schematic diagram with respect to another embodiment of the elliptically polarizing plate according to the invention;

FIG. 3 is a schematic diagram showing an embodiment of the liquid crystal display according to the invention; and FIG. 4 is a schematic diagram showing a liquid crystal display according to a comparative example.

In Figures., reference marks represent following:
reference mark A represents a retardation film that satisfies the relation nx>ny≈nz;
reference mark B represents a retardation film that satisfies the relation $nz_1>nx_1\approx ny_1$;
reference mark 1a represents a polarizer;
reference mark 2 represents an optical film; and
LC represents a liquid crystal cell.

BEST MODE FOR CARRYING OUT THE INVENTION

The elliptically polarizing plate of the invention is described below with reference to FIGS. 1 and 2. As shown in FIGS. 1 and 2, the elliptically polarizing plate of the invention includes a polarizer 1a and an optical film 2 that includes a laminate of the retardation films A and B and is laminated on one side of the polarizer 1a. As shown in FIGS. 1 and 2, a protective film 1b may be laminated on the other side of the polarizer 1a. Such a laminate of the polarizer 1a and the protective film 1b is shown as a polarizing plate 1. The optical film 2 also serves as a protective film for the polarizer 1a. In the elliptically polarizing plate of the invention, the laminate is also formed such that the slow axis of the retardation film A is perpendicular to the absorption axis of the polarizer 1a.

In the elliptically polarizing plate shown in FIGS. 1 and 2, the order of the lamination for the optical film 2 with respect to the polarizer 1a is not particularly limited. However, in order that color shift and a reduction in contrast may be suppressed with the elliptically polarizing plate implemented in a liquid crystal display, the retardation film A and the retardation film B should preferably be laminated in this order from the polarizer 1a side as shown in FIG. 1. In FIGS. 1 and 2, the polarizer 1a and the retardation films A and B are laminated through a pressure-sensitive adhesive layer or an adhesive layer. The pressure-sensitive adhesive layer or the adhesive layer may be a single layer or a laminate of two or more layers.

The retardation film A to be used satisfies the relation nx>ny≈nz, wherein nx is a refractive index in the direction of X axis along which the in-plane refractive index of the film is maximum, ny is a refractive index in the direction of Y axis perpendicular to X axis, and nz is a refractive index in the direction of Z axis that is the direction of the thickness of the film. Specifically, the material used for the retardation film A exhibits optically positive uniaxiality and has a three-dimensional optical indicatrix in which the refractive index in a single principal axis direction is higher than the refractive indices in the other two directions.

The retardation film A may be obtained by uniaxially or biaxially stretching, in the in-plane direction or directions, a polymer film made of a cyclic polyolefin resin-containing thermoplastic polymer. For example, a norbornene resin is exemplified as the cyclic polyolefin resin.

Examples of the norbornene resin include (1) ring-opened (co)polymers of norbornene monomers, modified polymer products thereof such as maleic acid adducts thereof and cyclopentadiene adducts thereof, and hydrogenated resin products thereof; (2) resins prepared by addition polymerization of norbornene monomers; and (3) resins prepared by addition copolymerization of norbornene monomers and olefin monomers such as ethylene and α-olefins. The polymerization or the hydrogenation may be performed by any conventional method.

Examples of the norbornene monomers include norbornene and alkyl- and/or alkylidene-substituted products thereof such as 5-methyl-2-norbornene, 5-dimethyl-2-norbornene, 5-ethyl-2-norbornene, 5-butyl-2-norbornene, and 5-ethylidene-2-norbornene, and polar group (such as halogen)-substituted products thereof, dicyclopentadiene, 2,3-dihydrodicyclopentadiene or the like; dimethanooctahydronaphthalene and alkyl- and/or alkylidene-substituted products thereof and polar group (such as halogen)-substituted products thereof, such as 6-methyl-1,4:5,8-dimethano-1,4,4a,5,6,7,8,8a-octahydronaphthalene, 6-ethyl-1,4:5,8-dimethano-1,4,4a,5,6,7,8,8a-octahydronaphthalene, 6-ethylidene-1,4:5,8-dimethano-1,4,4a,5,6,7,8,8a-octahydronaphthalene, 6-chloro-1,4:5,8-dimethano-1,4,4a,5,6,7,8,8a-octahydronaphthalene, 6-cyano-1,4:5,8-dimethano-1,4,4a,5,6,7,8,8a-octahydronaphthalene, 6-pyridyl-1,4:5,8-dimethano-1,4,4a,5,6,7,8,8a-octahydronaphthalene, and 6-methoxycarbonyl-1,4:5,8-dimethano-1,4,4a,5,6,7,8,8a-octahydronaphthalene; and trimers or tetramers of cyclopentadiene, such as 4,9:5,8-dimethano-3a,4,4a,5,8,8a,9,9a-octahydro-1H-benzoindene and 4,11:5,10:6,9-trimethano-3a,4,4a,5,5a,6,9,9a,10,10a,11,11a-dodecahydro-1H-cyclopentaanthracene.

The norbornene resin may be used in combination with other ring-opening polymerizable cycloolefins, as long as the objects of the invention are not defeated. Examples of such cycloolefins include compounds having a single reactive double bond, such as cyclopentene, cyclooctene and 5,6-dihydrodicyclopentadiene.

The number-average molecular weight (Mn) of the norbornene rein, which may be measured by a gel permeation chromatography (GPC) method with a toluene solvent, may be in the range of 25,000 to 200,000, preferably in the range of 30,000 to 100,000, more preferably in the range of 40,000 to 80,000. Number-average molecular weights in the above range can provide products with good mechanical strength, solubility, formability, and casting workability.

In the case where the norbornene resin is produced by hydrogenating a ring-opened polymer of a norbornene monomer, the degree of hydrogenation is generally at least 90%, preferably at least 95%, more preferably at least 99%, in terms of resistance to thermal degradation, resistance to photo-degradation, or the like.

Examples of the norbornene resin-containing film include ZEONOR films manufactured by Nippon Zeon Co., Ltd. and ARTON films manufactured by JSR Corporation.

The retardation film A with a front retardation ((nx−ny)d (d: thickness (nm)) of 50 to 210 nm is effective in suppressing a reduction in contrast or providing an improvement against color shift. The front retardation is preferably at least 70 nm, more preferably at least 80 nm, still more preferably at least 90 nm. The front retardation is preferably at most 200 nm, more preferably at most 190 nm. The thickness (d) of the retardation film A is preferably, but not limited to, from 1 to 200 μm, more preferably from 2 to 100 μm.

The retardation film B used is fixed to homeotropic alignment and has positive refractive-index anisotropy characterized by $nz_1 > nx_1 \approx ny_1$, wherein $nx_1$ is a refractive index in the direction of X axis along which the in-plane refractive index is maximum, $ny_1$ is a refractive index in the direction of Y axis perpendicular to X axis, and $nz_1$ is a refractive index in the direction of Z axis that is the direction of the thickness. The retardation film B is obtained by aligning a liquid crystal material, for example, with a vertical alignment agent. For example, a nematic liquid crystal compound has been known as a liquid crystal compound that can be homeotropic aligned. A general statement concerning such an alignment technique of the liquid crystal compound is given in, for example, "Kagaku Sosetsu 44 (surface modification, edited by The Chemical Society of Japan, pp. 156 to 163).

The liquid crystal materials may be mentioned, for example, a side-chain type liquid crystal polymer including a monomer unit (a) containing a liquid crystalline fragment side chain and having positive refractive-index anisotropy and a monomer unit (b) containing a non-liquid crystalline fragment side chain. The side chain type liquid crystal polymer can realize a homeotropic alignment of the liquid crystal polymer even without using a vertical alignment film.

The above-mentioned monomer unit (a) has a side chain with nematic liquid crystalline, for example, a monomer unit represented by the following general formula (1) may be mentioned.

[Chemical formula 1]

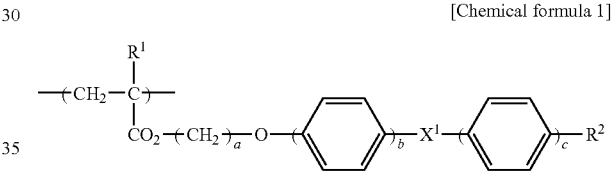

where, $R^1$ is a hydrogen atom or a methyl group, a is a positive integer of 1 to 6, $X^1$ is —$CO_2$— group or —OCO— group, $R^2$ is a cyano group, an alkoxy group with 1 to 6 carbon, fluoro group or alkyl group with 1 to 6 carbon, and b and c are integers of 1 or 2 respectively.

Moreover, as a monomer unit (b) has a linear side chain, for example, a monomer unit represented by the following general formula (2) may be mentioned.

[Chemical formula 2]

where, $R^3$ is a hydrogen atom or a methyl group, $R^4$ is an alkyl group with 1 to 22 carbon, a fluoroalkyl group with 1 to 22 carbon, or a monomer unit represented by the general formula (3):

[Chemical formula 3]

where, d is a positive integer of 1 to 6, and $R^5$ is an alkyl group with 1 to 6 carbon.

Besides, the ratio of the monomer unit (a) and the monomer unit (b) is not limited in particular. Although the ratio varies also according to the kinds of monomer units, since the side chain type liquid crystal polymer does not show liquid crystal monodomain alignment property when the ratio of the monomer unit (b) increases, the percentage is preferably defined in a range of (b)/{(a)+(b)}=0.01 to 0.8 (mole ratio), more preferably 0.1 to 0.5.

As the liquid crystal polymer that can form the homeotropic aligned liquid crystal film, the side chain type liquid crystal polymer comprising the monomer unit (a) including a liquid crystalline fragment side chain and a monomer unit (c) including liquid crystalline fragment side chain having an alicyclic cyclic structure may be mentioned.

The monomer unit (c) has a side chain exhibiting a nematic liquid crystallinity, and, for example, such a monomer unit may be mentioned that is represented with a general formula (4):

[Chemical formula 4]

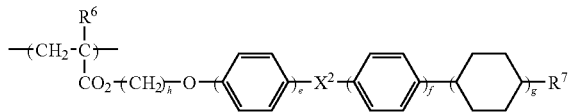

where, $R^6$ represents a hydrogen atom or a methyl group, h represents a positive integer of 1 to 6, $X^2$ represents a —$CO_2$— group or a —OCO-group, e and g represent integers of 1 or 2, f represents an integer of 0 to 2, and $R^7$ represents a cyano group and an alkyl group having a carbon number of 1 to 12.

In addition, a ratio of the monomer unit (a) and the monomer unit (c) is not especially limited, and may also be varied depending on kinds of the monomer units. Since the side chain type liquid crystal polymer tends to show less liquid crystal mono-domain alignment property as a percentage of the monomer unit (c) increases, preferably (c)/{(a)+(c)}=0.01 to 0.8 (mole ratio). Especially it is more preferably 0.1 to 0.6.

Liquid crystal polymers that can form the retardation film B are not limited to the illustrated examples having the monomer units, and more than one of the illustrated monomer units may be appropriately combined.

A weight average molecular weight of the above-mentioned side chain type liquid crystal polymer is preferably in a range of 2000 to 100000. Performance as a liquid crystal polymer is demonstrated by adjusting the weight average molecular weight into this range. The weight average molecular weight is preferably 2500 or more, because the film forming property of an alignment layer shows a tendency of being poor when the weight average molecular weight of the side chain type liquid crystal polymer is too small. On the other hand, the weight average molecular weight is preferably 50000 or less because if the weight average molecular weight is too large the polymer has a tendency of forming a poor alignment state caused by a poor alignment property as liquid crystal.

Moreover, the above-illustrated side chain type liquid crystal polymer can be prepared by copolymerization of acrylic based monomers or methacrylic based monomers corresponding to the monomer unit (a), the monomer unit (b), and the monomer unit (c). And monomers corresponding to the monomer unit (a), the monomer unit (b), and the monomer unit (c) may be synthesized by well-known methods. Preparation of the copolymer may be performed according to, for example, conventional polymerization methods for acrylic based monomers, such as radical polymerization methods, cationic polymerization methods, and anion polymerization methods etc. In addition, when a radical polymerization method is used, various kinds of polymerization initiators may be used, and especially, polymerization initiators, such as azobis-iso-butyronitril, benzoyl peroxide, etc. may preferably be used that has medium, not excessively high nor excessively low, decomposition temperatures.

Photopolymerizable liquid crystalline compound may be blended to the side chain type liquid crystal polymer to obtain liquid crystalline composition. The photopolymerizable liquid crystalline compound is a liquid crystalline compound that has at least one unsaturated double bond, such as acryloyl groups or methacryloyl groups, as a photopolymerizable functional group, of which nematic liquid crystalline compound is preferably used. As the photopolymerizable liquid crystalline compounds, acrylates and methacrylates that copolymerizable with the monomer unit (a) may be illustrated. In order to improve durability, compounds that have two or more photopolymerizable functional groups are preferable as the photopolymerizable liquid crystalline compounds. As such photopolymerizable liquid crystalline compounds, cross link-type nematic liquid crystal monomer represented with a following general formula(5) may be illustrated:

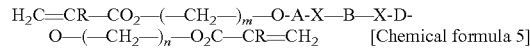
[Chemical formula 5]

where, R represents a hydrogen atom or a methyl group; A and D represent independently a 1,4-phenylene group or a 1,4-cyclo hexylene group, respectively; X independently represents a —COO-group, a —OCO-group, or a —O-group, respectively; B represents a 1,4-phenylene group, a 1,4-cyclo hexylene group, a 4,4'-biphenylene group, or a 4,4'-bicyclo hexylene group; and m and n independently represent integers of 2 to 6, respectively. Moreover, as photopolymerizable liquid crystalline compounds, there may be mentioned: compounds whose terminal "$H_2C$=CR—$CO_2$—" in the general formula (d) is substituted by a vinyl ether group or an epoxy group, and compounds whose "—$(CH_2)_m$—" and/or "—$(CH_2)_n$—" is substituted by "—$(CH_2)_3$—$C^*H(CH_3)$—$(CH_2)_2$—" or "—$(CH_2)_2$—$C^*H(CH_3)$—$(CH_2)_3$—".

The above-mentioned photopolymerizable liquid crystalline compound gives liquid crystal state by heat treatment, which may show, for example, a nematic liquid crystal layer, and provide homeotropic alignment together with the side chain type liquid crystal polymer. And subsequently the photopolymerizable liquid crystalline compound is polymerized or cross-linked to improve durability of the homeotropic aligned liquid crystal film.

A ratio of the photopolymerizable liquid crystalline compound and the side chain type liquid crystal polymer in the liquid crystalline composition is not especially limited, and appropriately determined in consideration of durability of the homeotropic aligned liquid crystal film to be obtained. Usually, preferably, by weight ratio, (photopolymerizable liquid crystalline compound):(side chain type liquid crystal polymer)=0.1:1 to 30:1, more preferably 0.5:1 to 20:1, and still more preferably 1:1 to 10:1.

The liquid crystalline composition usually includes a photopolymerization initiator. As photopolymerization initiators, various kinds of initiators may be used without any limitation. As photopolymerization initiators, for example, Irgacure 907, for example, Irgacure 184, Irgacure 651, Irgacure 369, etc. by Ciba Specialty Chemicals may be illustrated. In consideration of kinds of the photopolymerizable liquid crystal compounds, compounding ratios of the liquid crystalline composition, etc., the amount of the photo polymerization initiator is added that does not disturb homeotropic alignment of the liquid crystalline composition. Usually, the amount is preferably about 0.5 to 30 parts by weight base on 100 parts by weight of the photopolymerizable liquid crystalline compound, and especially preferably 3 parts or more by weight.

Production of the retardation film 2 is performed by a following method: the homeotropic side chain type liquid crystal polymer is coated on a substrate, subsequently, the side chain type liquid crystal polymer is spontaneously aligned in a liquid crystal state, and then the aligned liquid crystal is fixed in a state that the alignment state is maintained. Moreover, a following method is adopted when using a homeotropic liquid crystalline composition comprising the side chain type liquid crystal polymer and the photopolymerizable liquid crystalline compound: the homeotropic liquid crystalline composition is coated on a substrate; subsequently, the liquid crystalline composition is spontaneously aligned in a liquid crystal state; then the aligned liquid crystal is fixed in a state that the alignment state is maintained, and then is light irradiated.

Substrates that the side chain type liquid crystal polymer or the liquid crystalline composition coat may have any shape of glass substrates, metallic foils, plastic sheets, or plastic films. Any kinds of plastic films may be used without special limitation as long as they are not affected nor give any variation by temperatures at which alignment is conducted. For example, there may be mentioned films formed of transparent polymers: polyester based polymers, such as polyethylene terephthalate and polyethylene naphthalene's; cellulose based polymers, such as diacetyl celluloses and triacetyl celluloses; polycarbonate based polymers; and acrylic polymers, such as poly methylmethacrylates etc. The substrate does not necessarily require a vertical alignment film provided thereon. Thickness of the substrate is usually about 10 to 1000 µm.

As methods for coating the side chain type liquid crystal polymer or the liquid crystalline composition onto a substrate, a solution coating method using a solution comprising the side chain type liquid crystal polymer or the liquid crystalline composition dissolved in a solvent, or a melt-coating method for coating the molten liquid crystal polymer or the molten liquid crystalline composition may be mentioned. Among them, the solution coating method for coating the solution of the side chain type liquid crystal polymer or the liquid crystalline composition on the supporting substrate is preferable.

As methods for coating the solution of the side chain type liquid crystal polymer or the liquid crystalline composition, which is adjusted to a desired concentration using the above-mentioned solvents, to the anchor coat layer on the substrate, for example, a roll coating method, a photogravure coating method, a spin coating method, a bar coating method, etc. may be used. The solvent is removed after coating and a liquid crystal polymer layer or a liquid crystalline composition layer is formed on the substrate. Conditions for removal of the solvent are not especially limited as long as most of the solvent is removed, or the liquid crystal polymer layer or the liquid crystalline composition layer do not flow around nor flow down. Usually, the solvent is removed using methods, such as drying at room temperatures, drying in a drying furnace, and heating on a hot plate. Among the coating methods, it is preferable in the invention to adopt a photogravure coating method because of easiness of uniform coating over a large area.

Subsequently, the side chain type liquid crystal polymer layer or the liquid crystalline composition layer formed on a supporting substrate is made in a liquid crystal state and is spontaneously aligned. For example, heat treatment is performed so as to give the side chain type liquid crystal polymer or the liquid crystalline composition within a liquid crystal temperature range, and they are homeotropically aligned in liquid crystal state. The heat treatment method may be performed by the same method as the above-mentioned drying methods. The heat treatment temperature is varied depending on the kinds of the side chain type liquid crystal polymers or the liquid crystalline compositions, and supporting substrates to be used, and usually, but not limited to, is in a range of 60 to 300° C., and preferably in a range of 70 to 200° C. Moreover, the heat treatment period of time is varied depending on the heat treatment temperature, and the kinds of the side chain type liquid crystal polymers or the liquid crystalline compositions and kinds of substrates to be used, and usually, but not limited to, is in a range of 10 seconds to 2 hours, and preferably of 20 seconds to 30 minutes. When a heat treatment period of time is shorter than 10 seconds, there is a possibility that formation of homeotropic alignment may not adequately advance. Of the alignment temperatures and alignment times, it is preferable in the invention to conduct at an alignment temperature in the range of from 80 to 150° C. for an alignment time of the order in the range of from 30 sec to 10 min from the standpoints of workability and mass production.

Cooling operation is performed after the heat treatment. Displacing the homeotropic aligned liquid crystal film after heat treatment into a room temperature atmosphere from a heating atmosphere during the heat treatment operation may perform cooling operation. Forced cooling, such as air cooling and water cooling, may be performed. By cooling not more than a glass transition temperature of the side chain type liquid crystal polymer, alignment of the homeotropically aligned layer of the side chain type liquid crystal polymer is fixed.

For the liquid crystalline composition, by irradiating the fixed homeotropic aligned liquid crystal layer, the photopolymerizable liquid crystalline compound is polymerized or cross-linked to fix the photopolymerizable liquid crystalline compound, resulting in a homeotropic aligned liquid crystal layer having improved durability. Light irradiation is, for example, UV irradiation. In order to promote the reaction adequately, UV irradiation conditions are preferably in inert gas atmosphere. Usually, a high pressure mercury ultraviolet lamp having illumination of approximately 80 to 160 mW/cm$^2$ is typically used. Lamps of another kind, such as meta-halide UV lamp and incandescent tube, may also be used. Moreover, adjustment of temperatures is adequately performed by cooling treatments by cold mirror, water cooling, and others or by increase in line velocities so as to give a temperature of the liquid crystal layer surface upon UV irradiation in a liquid crystal temperature range.

Thus, a thin film of the side chain type liquid crystal polymer or the liquid crystalline composition is formed, and then is fixed, while alignment is being maintained, and thus the retardation film B is obtained. No specific limitation is placed on the thickness of the homeotropic aligned liquid crystal film, but the thickness of the homeotropic aligned liquid crystal film layer formed of the coated side chain type liquid crystal polymer is preferably in the range of about 0.3 to 200 µm, preferably 0.5 to 200 µm. The film with a thickness of 0.3 µm or less would be so thin that it can be difficult to control the thickness. The film with a thickness of more than 200 µm, when implemented in a liquid crystal display, can not only widen the horizontal or vertical viewing angle in some directions but also narrow the viewing angle in some directions. The retardation film B can be used either by peeling off from a substrate or without peeling off from a substrate.

A laminating method for the retardation film A and retardation film B is not especially limited, and lamination may be carried out using a pressure sensitive adhesive layer or an adhesive layer etc. As a material that forms the pressure sensitive adhesive layer or the adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used which is excellent in optical transparency, showing adhesion characteristics with moderate wettability, cohesiveness and adhesive property and has outstanding weather resistance, heat resistance, etc.

Proper method may be carried out to form the pressure sensitive adhesive layer or the adhesive layer. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on the substrate or the liquid crystal film using suitable developing methods, such as flow method and coating method, or a method in which the pressure sensitive adhesive layer or the adhesive layer is once formed on a separator, as mentioned above, and is then transferred on the liquid crystal layer.

The pressure sensitive adhesive layer or the adhesive layer may contain additives, for example, such as natural or synthetic resins, tackifier, glass fibers, glass beads, metal powder, fillers comprising other inorganic powder etc., pigments, colorants and antioxidants. Moreover, it may be a pressure sensitive adhesive layer that contains fine particle and shows optical diffusion nature.

Thickness of the pressure sensitive adhesive layer or the adhesive layer may be suitably determined depending on a purpose of usage or adhesive strength, etc., and generally is 1 to 500 µm, preferably 5 to 200 µm, and more preferably 10 to 100 µm.

A temporary separator is attached to an exposed side of the pressure sensitive adhesive layer or the adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, ultraviolet absorbing property may be given to the optical film, the above-mentioned each layer, such as the pressure sensitive adhesive layer or the adhesive layer, using a method of adding ultraviolet absorbents, such as salicylic acid ester type compounds, benzophenol type compounds, benzotriazol type compounds, cyano acrylate type compounds, and nickel complex salt type compounds.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film on which dichromatic materials such as iodine and dye, is absorbed and oriented is suitably used. Although thickness of polarizer is not especially limited, the thickness of about 5 to 80 µm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

The optical film (the retardation film A or the retardation film B) is laminated on one side of the polarizer, while on another side of the polarizer is generally provided a protective film. The protective film is ordinary protective film for the polarizer. As the protective film, with outstanding transparency, mechanical strength, heat stability, moisture cover property, isotropy, etc. may be preferable. As a materials forming the protective film, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; arylate type polymers; polyoxymethylene type polymers; epoxy type polymers; or blend polymers of the above-mentioned polymers may be mentioned. The protective film can be a film formed as a cured layer made of heat curing type or ultraviolet ray curing type resins, such as acryl based, urethane based, acryl urethane based, epoxy based, and silicone based.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

In viewpoint of the polarization property and durability, the protective film especially preferably used is a triacetyl cellulose film whose surface is saponified with alkaline. In general, a thickness of the protection film, which can be determined arbitrarily, is 10 to 500 μm, especially 20 to 300 μm, further 30 to 200 μm in viewpoint of strength, work handling and thin layer.

The protective film is preferably as colorless as possible. Thus, a protective film is preferably used which has a film-thickness-direction retardation of −90 nm to +75 nm, wherein the retardation (Rth) is represented by the formula: Rth=[(nx+ny)/(2−nz)]d, wherein nx and ny are each a principal refractive index in the plane of the film, nz is a refractive index in the film-thickness direction, and d is the thickness of the film. If a protective film with such a thickness-direction retardation value (Rth) of −90 nm to +75 nm is used, coloring (optical coloring) of the polarizing plate can be almost avoided, which could otherwise be caused by any other protective film. The thickness-direction retardation (Rth) is more preferably from −80 nm to +60 nm, particularly preferably from −70 nm to +45 nm.

Isocyanate based adhesives, polyvinyl alcohol based adhesives, gelatin based adhesives, vinyl based latex based, aqueous polyester based adhesives, and etc. may be used for adhesion processing for the above-mentioned polarizers and the protective film.

As the above-mentioned protective film, a film with a hard coat layer and various processing aiming for antireflection, sticking prevention and diffusion or anti glare may be used.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective layer.

The elliptically polarizing plate of the invention is suitable for IPS-mode liquid crystal display. IPS-mode liquid crystal display has a liquid crystal cell comprising: a pair of substrates sandwiching a liquid crystal layer; a group of electrodes formed on one of the above-mentioned pair of substrates; a liquid crystal composition material layer having dielectric anisotropy sandwiched between the above-mentioned substrates; an orientation controlling layer that is formed on each of surfaces, facing each other, of the above-mentioned pair of substrates in order to orient molecules of the above-mentioned liquid crystal composition material in a predetermined direction, and driving means for applying driver voltage to the above-mentioned group of electrodes. The above-mentioned group of electrodes has alignment structure arranged so that parallel electric field may mainly be applied to an interface to the above-mentioned orientation controlling layer and the above-mentioned liquid crystal composition material layer.

The elliptically polarizing plate of the invention is placed on at least one of the viewer side and the incidence side of the liquid crystal cell. FIG. 3 shows a case where the elliptically polarizing plate of FIG. 1 is placed on the viewer side. As shown in FIG. 3, the elliptically polarizing plate is preferably placed in such a manner that the optical film 2 side faces a liquid crystal cell LC. In FIG. 3, a polarizing plate 1' is placed on the opposite side (light incidence side) of the liquid crystal cell 4, on which the elliptically polarizing plate is disposed. The absorption axes of the polarizing plate 1' and the elliptically polarizing plate (the polarizing plate 1) placed on both sides with respect to the substrate of the liquid crystal cell LC are disposed perpendicular to each other. A laminate including a polarizer 1a and protective films 1b laminated on both sides of the polarizer 1a is generally used as the polarizing plate 1'.

While FIG. 3 shows an example of a liquid crystal cell for a liquid crystal display, the elliptically polarizing plate of the invention may also be applied to a variety of other types of liquid crystal displays.

EXAMPLES

While an embodiment of the invention is described using the examples below, it will be understood that the invention is not limited to the examples.

The refractive indices and retardations of each optical film were determined by measuring the principal in-plane and thickness direction refractive indices nx, ny and nz of the film at a wavelength of 590 nm ($\lambda$=590 nm) with an automatic birefringence measurement system (Automatic Birefringence Analyzer KOBRA 21ADH manufactured by Oji Scientific Instruments).

Reference Example (Polarizer)

A polyvinyl alcohol film was allowed to swell by immersing it in warm water and then dyed in an aqueous iodine/potassium iodide solution and then uniaxially stretched in an aqueous boric acid solution to obtain a polarizer. The polarizer was measured for single transmittance, parallel transmittance and crossed transmittance. As a result, it had a transmittance of 43.5% and a degree of polarization of 99.9%.

Example 1

(Retardation Film A)

A 100 μm-thick unstretched norbornene film (ARTON Film manufactured by JSR Corporation) was uniaxially stretched 1.3 times at 170° C. The resulting stretched film had a thickness of 80 μm and a front retardation of 100 nm. The resulting stretched film had uniaxially-aligned positive refractive-index anisotropy (nx>ny≈nz).

(Retardation Film B)

[Chemical formula 6]

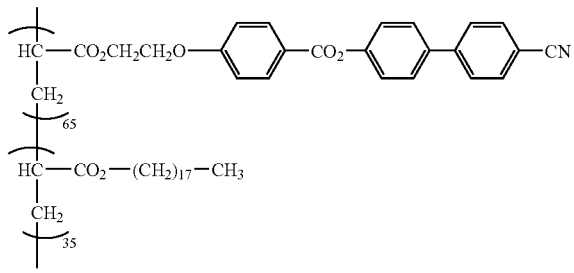

Dissolved into 75 parts by weight of cyclohexanone were 5 parts by weight of a side chain type liquid crystal polymer expressed by the chemical formula 6 (wherein numerals each indicate a molar percentage of a monomer unit, and which is exhibited by a block polymer unit for convenience, and a weight average molecular weight was 5000); 20 parts by weight of a polymerizable liquid crystal showing a nematic liquid crystal phase (Paliocolor LC242, manufactured by BASF LTD.) and 3 parts by weight of a photoinitiator (IRGACURE 907 manufactured by Ciba Specialty Chemicals Co.) to polymerizable liquid crystal to thereby prepare a solution. The solution was coated on a ZEONOR film manufactured by Nippon Zeon Co., to thickness of 1.0 μm with a bar coater, the wet coat was dried at 100° C. for 10 min, the dry coat is illuminated with UV and cured to thereby obtain a homeotropic aligned liquid crystal layer. The optical retardation of the sample was measured (wherein the light for the measurement was incident perpendicularly or obliquely to the surface of the sample). As a result, its front retardation was almost zero, and its retardation increased as the incidence angle of the light for the measurement increased. Thus, it was demonstrated that homeotropic alignment was achieved. The homeotropically aligned liquid crystal film layer had a thickness direction retardation of −100 nm.

(Elliptically Polarizing Plate)

An 80 μm-thick triacetylcellulose (TAC) film with a front retardation of 6 nm and a thickness direction retardation of 60 nm was bonded to one side of the polarizer obtained in Reference Example through a polyvinyl alcohol adhesive to form a transparent protective layer. The retardation film A was bonded to the other side of the polarizer through a polyvinyl alcohol adhesive in such a manner that the absorption axis of the polarizer was perpendicular to the slow axis of the retardation film A. The retardation film B was bonded to the retardation film A through an acrylic pressure-sensitive adhesive. The ZEONOR film was then peeled off so that an elliptically polarizing plate was obtained.

Example 2

(Retardation Film A)

A 100 μm-thick unstretched norbornene film (ARTON Film manufactured by JSR Corporation) was uniaxially stretched 1.4 times at 170° C. The resulting stretched film had a thickness of 70 μm and a front retardation of 180 nm. The resulting stretched film had uniaxially-aligned positive refractive-index anisotropy (nx>ny≈nz).

(Retardation Film B)

A homeotropically aligned liquid crystal film layer was obtained using the process of Example 1, except that the thickness of the homeotropically aligned liquid crystal film layer was set at 0.5 μm. The homeotropically aligned liquid crystal film layer had a thickness direction retardation of −50 nm.

(Elliptically Polarizing Plate)

An elliptically polarizing plate was obtained using the process of Example 1, except that the retardation films A and B obtained as described above were used.

Example 3

(Retardation Film A)

A 100 μm-thick unstretched norbornene film (ARTON Film manufactured by JSR Corporation) was uniaxially stretched 1.35 times at 175° C. The resulting stretched film had a thickness of 70 μm and a front retardation of 140 nm. The resulting stretched film had uniaxially-aligned positive refractive-index anisotropy (nx>ny≈nz).

(Retardation Film B)

A homeotropically aligned liquid crystal film layer was obtained using the process of Example 1, except that the thickness of the homeotropically aligned liquid crystal film layer was set at 1.3 μm. The homeotropically aligned liquid crystal film layer had a thickness direction retardation of −130 nm.

(Elliptically Polarizing Plate)

An elliptically polarizing plate was obtained using the process of Example 1, except that the retardation films A and B obtained as described above were used.

Comparative Example 1

An 80 μm-thick triacetylcellulose (TAC) film with a front retardation of 6 nm and a thickness direction retardation of 60 nm was bonded to one side of the polarizer obtained in Reference Example through a polyvinyl alcohol adhesive to form a transparent protective layer. An 80 μm-thick triacetylcellulose (TAC) film with a front retardation of 6 nm and a thickness direction retardation of 60 nm was bonded to the other side of the polarizer through a polyvinyl alcohol adhesive so that a polarizing plate was obtained.

Comparative Example 2

A 40 μm-thick triacetylcellulose (TAC) film with a front retardation of 3 nm and a thickness direction retardation of 40 nm was bonded to one side of the polarizer obtained in Reference Example through a polyvinyl alcohol adhesive to form a transparent protective layer. A 40 μm-thick triacetylcellulose (TAC) film with a front retardation of 3 nm and a thickness direction retardation of 40 nm was bonded to the other side of the polarizer through a polyvinyl alcohol adhesive so that a polarizing plate was obtained.

Comparative Example 3

(Retardation Film A)

A 80 μm-thick polycarbonate film was uniaxially stretched 1.3 times at 175° C. The resulting stretched film had a thickness of 50 μm and a front retardation of 300 nm. The resulting stretched film had uniaxially-aligned positive refractive-index anisotropy (nx>ny≈nz).

(Retardation Film B)

A homeotropically aligned liquid crystal film layer was obtained using the process of Example 1, except that the thickness of the homeotropically aligned liquid crystal film layer was set at 3.0 μm. The homeotropically aligned liquid crystal film layer had a thickness direction retardation of −300 nm.

(Elliptically Polarizing Plate)

An elliptically polarizing plate was obtained using the process of Example 1, except that the retardation film A' obtained as described above was used in place of the retardation film A and that the retardation film B obtained as described above was alternatively used.

(Evaluation)

The elliptically polarizing plates or the polarizing plates obtained as described above were evaluated as described below. The results are shown in Table 1.

(Viewing Angle)

The elliptically polarizing plate obtained in each of Examples 1 to 3 was place on the viewer side of an IPS mode liquid crystal cell as shown in FIG. 3. The polarizing plate obtained in each of Comparative Examples 1 and 2 was placed on the viewer side of an IPS mode liquid crystal cell as shown in FIG. 4. The elliptically polarizing plate obtained in Comparative Example 3 was used in place of the elliptically polarizing plate used in Example 1. On the other hand, the polarizing plate obtained in Comparative Example 1 was placed on the incidence side (backlight side).

While a white or black image was displayed on the liquid crystal display, Y, x and y values in the XYZ color system were measured horizontally, vertically and in opposite angle directions (45° and −225° and 135° and −315°) with EZcontrast 160D manufactured by ELDIM. In the measurement, an angle at which the contrast value (Y value (white image)/Y value (black image)) became at least 25 was defined as the viewing angle.

(Unevenness Caused by Bonding Stress)

The elliptically polarizing plates or polarizing plates (400 mm×300 mm) obtained as described above were bonded to an alkali glass through an acrylic pressure-sensitive adhesive (20 μm) with a roller in the crossed nicol arrangement. After the bonding, the laminate was illuminated by a backlight and then visually examined for stress-induced unevenness according to the criteria below.

○: Light leakage was not observed.
x: Light leakage was observed.

(Durability to Heating)

The elliptically polarizing plates or polarizing plates (300 mm×200 mm) obtained as described above were pressed and bonded to an alkali glass through an acrylic pressure-sensitive adhesive (20 μm) with a roller in the crossed nicol arrangement. Thereafter, the laminate was degassed by autoclave treatment at 50° C. under a pressure of five atmospheres for 15 minutes. After the laminate was placed in an 80° C. environment for 100 hours, it was illuminated by a backlight and then visually examined for peripheral unevenness according to the criteria below.

TABLE 1

|  | Example 1 | Example 2 | Example 3 | Comparative Example 1 | Comparative Example 2 | Comparative Example 3 |
|---|---|---|---|---|---|---|
| Viewing Angle | 70 | 70 | 65 | 40 | 40 | 30 |
| Stress-Induced Unevenness | ○ | ○ | ○ | ○ | ○ | x |
| Heating Durability | ○ | ○ | ○ | ○ | ○ | x |

○: Light leakage was not observed.
x: Light leakage was observed.

INDUSTRIAL APPLICABILITY

The elliptically polarizing plate of the invention is suitable for use in image displays such as liquid crystal displays, organic electro-luminescence displays and plasma display panels. In particular, the elliptically polarizing plate of the invention is suitable for in-plane switching (IPS) mode active matrix liquid crystal displays.

The invention claimed is:

1. An elliptically polarizing plate, comprising:
   a polarizer; and
   an optical film that comprises a laminate of:
   a retardation film A that comprises a cyclic polyolefin resin-containing thermoplastic polymer and has uniaxially-aligned positive refractive-index anisotropy characterized by nx>ny≈nz, wherein nx is a refractive index in the direction of an X axis, along which the in-plane refractive index is maximum, ny is a refractive index in the direction of a Y axis, perpendicular to the X axis, and nz is a refractive index in the direction of a Z axis that is the direction of the thickness; and
   a retardation film B that is fixed to homeotropic alignment and has positive refractive-index anisotropy characterized by $nz_1 > nx_1 \approx ny_1$, wherein $nx_1$ is a refractive index in the direction of the X axis, along which the in-plane refractive index is maximum, $ny_1$ is a refractive index in the direction of the Y axis, perpendicular to the X axis, and $nz_1$ is a refractive index in the direction of the Z axis that is the direction of the thickness, the thickness direction retardation of retardation film B is from −300 nm to −30 nm wherein
   the optical film is laminated on one side of the polarizer in such a manner that a slow axis of the retardation film A is perpendicular to an absorption axis of the polarizer;

wherein the optical film is laminated in such a manner that the retardation film A and the retardation film B are placed in this order from the polarizer; and wherein the elliptically polarizing plate is used in such a manner that the optical film side faces an in-plane switching (IPS) mode liquid crystal cell.

2. The elliptically polarizing plate according to claim 1, wherein the retardation film A is a norbornene resin-containing film.

3. The elliptically polarizing plate according to claim 1, wherein the retardation film B has a thickness direction retardation $[((nx_1+ny_1)/2)-nz_1] \times d$ of $-200$ nm to $-50$ nm, wherein d is the thickness (nm) of the film.

4. The elliptically polarizing plate according to claim 1, wherein the retardation film B is a film containing a side chain type liquid crystal polymer.

5. The elliptically polarizing plate according to claim 1, wherein the retardation film A is a quarter wavelength plate.

6. An image display, comprising the elliptically polarizing plate according to claim 1.

7. A liquid crystal display, comprising the elliptically polarizing plate according to claim 1.

8. The liquid crystal display according to claim 7, wherein the liquid crystal display is driven in an in-plane switching (IPS) mode.

* * * * *